US005946404A

United States Patent [19]

Bakshi et al.

[11] Patent Number: 5,946,404

[45] Date of Patent: Aug. 31, 1999

[54] AUDIO/VIDEO SURVEILLANCE AND RECORDING SYSTEM

[75] Inventors: Rajeev K. Bakshi, Delta; Marcel Veronesi, Vancouver; Michael Wall, Delta, all of Canada

[73] Assignee: Silent Witness Enterprises Ltd., Surrey, Canada

[21] Appl. No.: 09/062,401

[22] Filed: Apr. 20, 1998

Related U.S. Application Data

[63] Continuation of application No. 08/456,926, Jun. 1, 1995, abandoned.

[51] Int. Cl.[6] .......... G06K 9/00

[52] U.S. Cl. .......... 382/103; 16/383; 348/151

[58] Field of Search .......... 382/103, 100; 340/652; 348/143, 151, 373, 374, 375; 16/383, 384; 206/807, 1.5; 269/910; 439/207, 638, 450, 38, 892; 54/87

[56] References Cited

U.S. PATENT DOCUMENTS

| | | | |
|---|---|---|---|
| 3,835,995 | 9/1974 | Haines | 206/807 |
| 3,993,866 | 11/1976 | Pearl et al. | 348/151 |
| 4,063,229 | 12/1977 | Welsh et al. | 206/807 |
| 4,080,629 | 3/1978 | Hammond et al. | 348/373 |
| 4,160,999 | 7/1979 | Claggett | 348/151 |
| 4,344,545 | 8/1982 | Ascberger et al. | 206/807 |
| 4,381,836 | 5/1983 | Rivkin et al. | 206/807 |
| 4,901,146 | 2/1990 | Struhs et al. | 348/374 |
| 4,922,339 | 5/1990 | Stout et al. | 358/108 |
| 5,111,289 | 5/1992 | Lucas et al. | 348/148 |
| 5,164,827 | 11/1992 | Paff | 348/143 |
| 5,179,877 | 1/1993 | Down et al. | 81/443 |
| 5,223,872 | 6/1993 | Stiepel et al. | 348/143 |
| 5,293,990 | 3/1994 | Masakayan | 206/1.5 |
| 5,297,672 | 3/1994 | MacTavish | 206/1.5 |
| 5,319,394 | 6/1994 | Dukek | 340/636 |
| 5,332,993 | 7/1994 | Ninomiya | 340/636 |
| 5,394,209 | 2/1995 | Stiepel et al. | 348/143 |
| 5,418,567 | 5/1995 | Boers et al. | 348/143 |
| 5,430,511 | 7/1995 | Paff et al. | 348/143 |
| 5,515,030 | 5/1996 | Citron et al. | 340/652 |
| 5,517,236 | 5/1996 | Sergeant et al. | 348/43 |
| 5,560,707 | 10/1996 | Neer | 362/376 |

FOREIGN PATENT DOCUMENTS

| | | | |
|---|---|---|---|
| 562 948 | 3/1993 | European Pat. Off. | 348/143 |
| 2422965 | 11/1975 | Germany | 348/143 |

*Primary Examiner*—Jon Chang
*Assistant Examiner*—Jayanti K. Patel
*Attorney, Agent, or Firm*—Oyen Wiggs Green & Mutala

[57] ABSTRACT

An audio/video surveillance recording system comprising both units having a video camera and units having a dummy lens is disclosed. The use of a dummy lens rather than tinted or mirrored glass on the camera housing provides a greater amount of light to the camera. A unique mounting assembly which lets the dummy units be substituted for the live units without removing the mounting brackets is also disclosed. Both the dummy and live units have illuminated indicators. The system uses weatherproof microphones manufactured using a novel plastic dipping and coating method.

9 Claims, 9 Drawing Sheets

AUDIO/VIDEO SURVEILLANCE AND RECORDING SYSTEM

CROSS-REFERENCE TO RELATED APPLICATIONS

This application is a continuation of application Ser. No. 08/456,926 filed Jun. 1, 1995 which application remains pending.

TECHNICAL FIELD

The invention relates to the field of audio/video surveillance and recording systems. More particularly it relates to audio/video monitoring and recording systems for use in school buses and similar environments.

BACKGROUND ART

Vehicle-mounted video or movie cameras are used for police vehicles to record events occurring outside the vehicle. See for example U.S. Pat. No. 5,111,289 Lucas et al. issued May 5, 1992; U.S. Pat. No. 5,102,335 Cohodar issued Apr. 30, 1991; U.S. Pat. No. 4,789,904 Peterson issued Dec. 6, 1988; and German patent application DE 40 16570 A1 Aichele et al. published Sep. 19, 1991. Monitoring cameras stored in protective housings are used for surveillance in stores, factories and the like. See for example U.S. Pat. No. 3,993,866 Pearl issued Nov. 23, 1976; and U.S. Pat. No. 4,160,999 Claggett issued Jul. 10, 1979. Other cameras are mounted in a vehicle for surveillance of the activities of occupants of the vehicle, such as U.S. Pat. No. 1,733,783 Medina issued Oct. 29, 1929; U.S. Pat. No. 3,752,047 Gordon et al. issued Aug. 14, 1973; and U.S. Pat. No. 5,282,182 Kreuzer issued Jan. 25, 1994.

Video monitoring systems are particularly useful for reducing vandalism and misbehaviour in certain applications such as school buses. In such applications, it is sufficient to have a proportion of "dummy" surveillance camera installations, which do not contain actual cameras, to lower the cost of the system without affecting significantly the effectiveness of the system in reducing misbehaviour by student passengers. In the past, tinted or mirrored glass has been used to conceal whether the box is a "dummy" or a "live" box. However the use of tinted or mirrored glass reduces the light which reaches the camera. Also, in the past it has been difficult to permit adjustment of the orientation of the monitor housing while still ensuring that the housing is not readily tampered with.

There is therefore a need for a video monitoring system which conceals dummy installations without reducing the effectiveness of live installations. There is a further need for monitor housings which can be installed and adjusted readily while not permitting tampering.

DISCLOSURE OF INVENTION

The present invention provides an audio/video surveillance recording system comprising both units having a video camera and units having a dummy lens. More particularly, the invention provides an audio/video surveillance recording system comprising i) a plurality of secure housings having a transparent lens aperture, at least one of the housings having a video camera adapted for producing a video signal mounted in the interior of the housing behind the lens aperture, and the remainder of the housings having a simulated lens in the interior of the housing behind the lens aperture; ii) a mounting assembly for adjustable securement to a surface and for removably receiving one of the secure housings; and iii) a video tape recorder connected to the one of the housings having a video camera for recording the video signal from the video camera.

The invention further provides a secure housing for a video monitoring camera comprising i) a first bracket member for securing to a surface about a first axis of rotation; ii) a second bracket member for securing to the first bracket member about a second axis of rotation perpendicular to the first axis of rotation; iii) a connector housing adapted for securing to the second bracket member about a third axis of rotation perpendicular to the first and second axes of rotation, and comprising cable means and connector means for connecting to a camera assembly within a camera housing; and iv) a camera housing having a front and a rear, adapted for securing the rear of the camera housing to the connector housing by means of a small number of tamper-resistant fasteners accessible from the front of the camera housing, and comprising a camera assembly for connecting to the connector means, wherein access to the interior of the camera housing is provided by fasteners accessible only from the rear of the camera housing.

The invention further provides a method of providing a weatherproof microphone, comprising i) providing a microphone element having a sound sensitive surface; ii) securing a raised rim to the sound sensitive surface adjacent the periphery thereof; iii) immersing the raised rim of the microphone element into a liquid plastic coating material such that the surface normal of the sound sensitive surface is perpendicular to the surface of the liquid plastic coating material; iv) removing the microphone element from the liquid plastic coating material and removing excess of the liquid plastic coating material from the raised rim of the microphone element; and v) permitting the liquid plastic coating material to dry.

BRIEF DESCRIPTION OF DRAWINGS

In drawings which illustrate a preferred embodiment of the invention.

BEST MODE(S) FOR CARRYING OUT THE INVENTION

Prior school bus audio/video monitoring and surveillance systems of Silent Witness Enterprises Ltd. provide a visible audio/video surveillance and recording system in school buses and the like to reduce misbehaviour and vandalism in such environments. These prior systems have used camcorders mounted in a secure housing. It has been found that the effectiveness of such systems is not significantly reduced, while the cost is significantly reduced, if dummy installations, without a camera, are used to replace a number of the installations with cameras. In the prior art noted above, the presence or absence of a camera has been camouflaged by the use of a half-silvered cover on the lens aperture. The present invention is also designed for use on school buses and in school classrooms, and to allow for the use of dummy units. However in the present system a separate video-cassette recorder ("VCR") is used in conjunction with a separate camera and microphone unit. The camera and microphone housing 10, shown in FIGS. 1 through 4, is mounted visibly in the area to be monitored, while the VCR is secured in a VCR box in a remote location.

Figure 4:
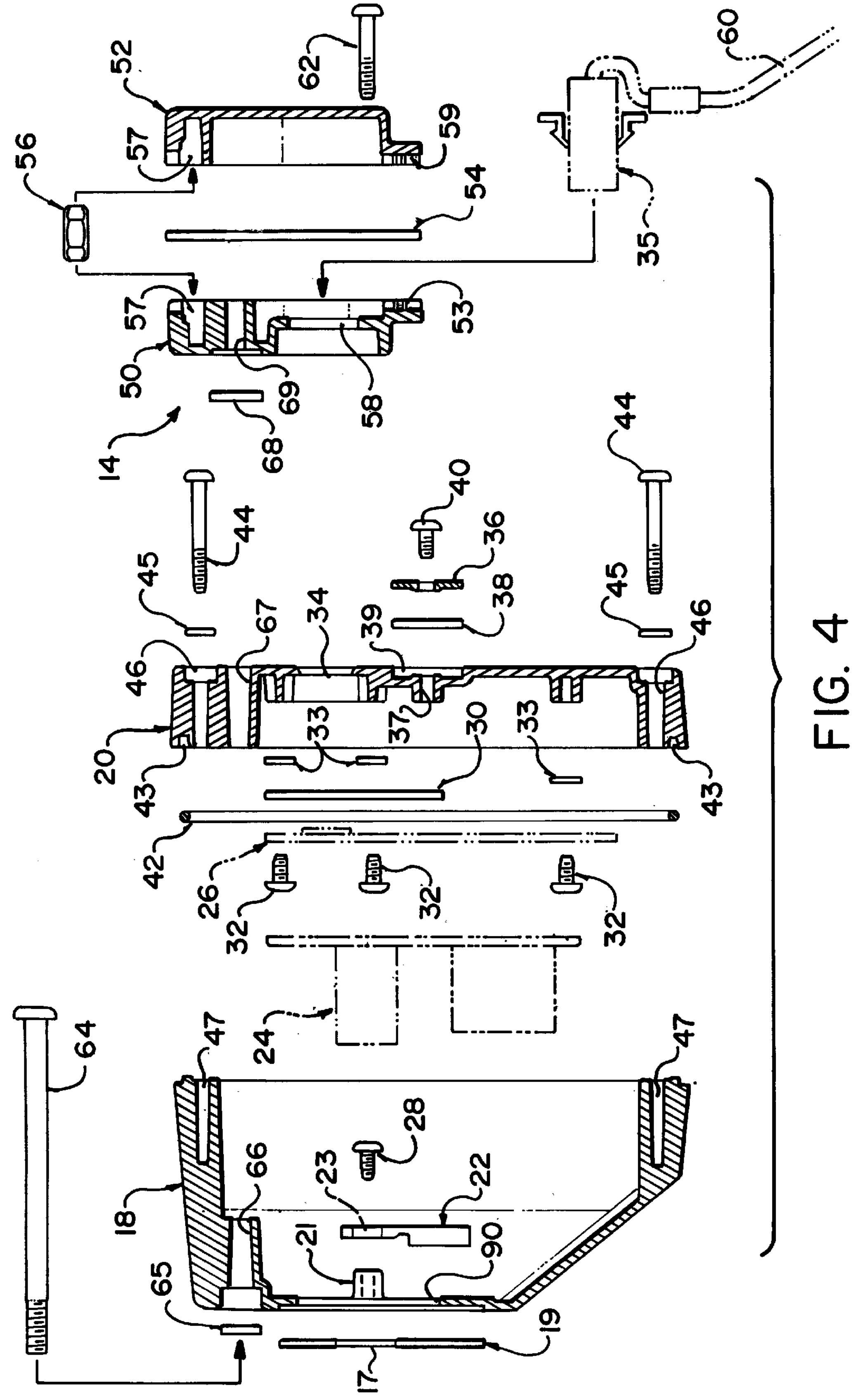
FIG. 4 is an exploded view of the housing shown in FIG. 2 in cross-section.

The camera housing 10 comprises a camera housing body 12, a mounting box 14, and a mounting bracket 16, all of which will typically be manufactured of die-cast zinc. The construction of the camera housing 10, which will be about 3"×3"×5" preferably, is shown in FIG. 4. It comprises a camera housing body front section 18 and a camera housing body back section 20. Mounted within camera housing 10 is either a dummy lens 22 or a camera assembly board 24, and motherboard 26. Dummy lens 22 is secured through slot 23 to a post 21 by screw 28. Dummy lens 22 may be swung into and out of alignment with transparent portion 17 of cover plate 19. Cover plate 19 is secured by adhesive to housing body 12 into a recess over aperture 90. Gasket 30 is secured to the back of the motherboard 26 by adhesive and the motherboard assembly is then secured to camera housing back section 20 by screws 32 and nylon washers 33. Hole 34 is provided in camera housing back section 20 for the connector assembly 35, and a video cover plate 36 is provided. A cover plate seal 38 is secured in recess 39 by adhesive and cover plate 36 is screwed to back section 20 by screw 40 through hole 37. A seal gasket 42, preferably of die-cut 60 durometer 3⁄32" black neoprene, which sits in groove 43, is provided between camera housing front and back sections 18, 20. Camera housing front and back sections 18, 20 are joined by two screws 44 which extend through nylon washers 45, through apertures 46 and into holes 47 in the front section 18.

Mounting box 14 comprises front section 50 and back section 52. A gasket 54 is secured to back section 52 by adhesive. A plurality of nuts 56 are held from rotation in recesses 57. Hole 58 is provided in mounting box front section 50 for the connector assembly 35 and aperture 59 is provided for attached cable 60 and has ridges 53 to grip the cable 60. Front section 50 and back section 52 are joined by screws 62 through holes 63. Camera housing body 12 is secured to mounting box 14 by a single tamper-proof bolt 64 extending through rubber weather seal washer 65, apertures 66, 67 and seal washer 68 into hole 69. Bolt 64 has a non-standard head, such as a spanner head, which requires a special tool to unfasten.

Figure 8:
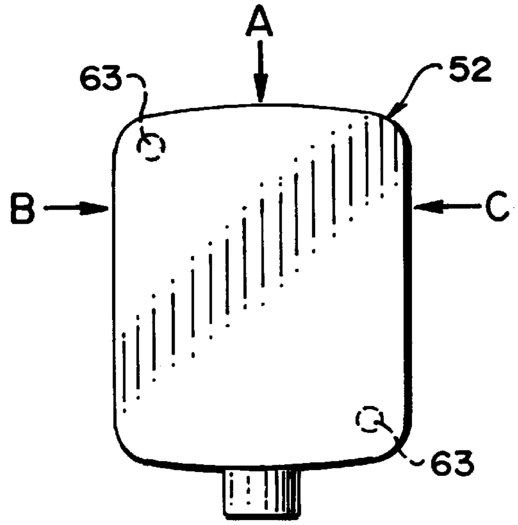
FIG. 8 is a rear view of the mount box.

Mounting bracket 16 comprises a wall mount bracket 70 and a swivel bracket 72. Swivel bracket 72 has a horizontal flange 74 provided with central hole 75 through which a hex head capscrew 76, or a tamper-proof bolt, mates with lockwasher 77 and nut 56. Similar attachment holes are provided at locations A, B and C shown in FIG. 8 to expand the flexibility of attachment. Swivel bracket 72 has a radiused vertical wall 78 to permit the mounting box 14 to be swivelled, and a plate 79. Plate 79 has a radiused edge 81 so it can be pivoted in relation to bracket 70. Wall mount bracket 70 has a flat plate 73 provided with a central hole 71 through which plate 70 is bolted to a wall bracket 171 by bolt 172 and about which bracket 70 may be pivoted. Bracket 70 has a vertical flange 87 which is perpendicular to plate 73 and which has a hole 80 through which a capscrew 85 is provided to secure flange 87 to plate 79 by threaded hole 83 in plate 79, and about which plate 79 may pivot relative to flange 87 when capscrew 85 is loosened.

The foregoing construction therefore allows the camera housing to be mounted in any desired orientation, by rotation about bolts or capscrews 76, 85 and about hole 71. It has the further advantage that the interior of the housing can be readily accessed only by unfastening a single tamper-proof screw 64. This is advantageous both for discouraging unauthorized access and facilitating quick authorized access.

Figure 1:
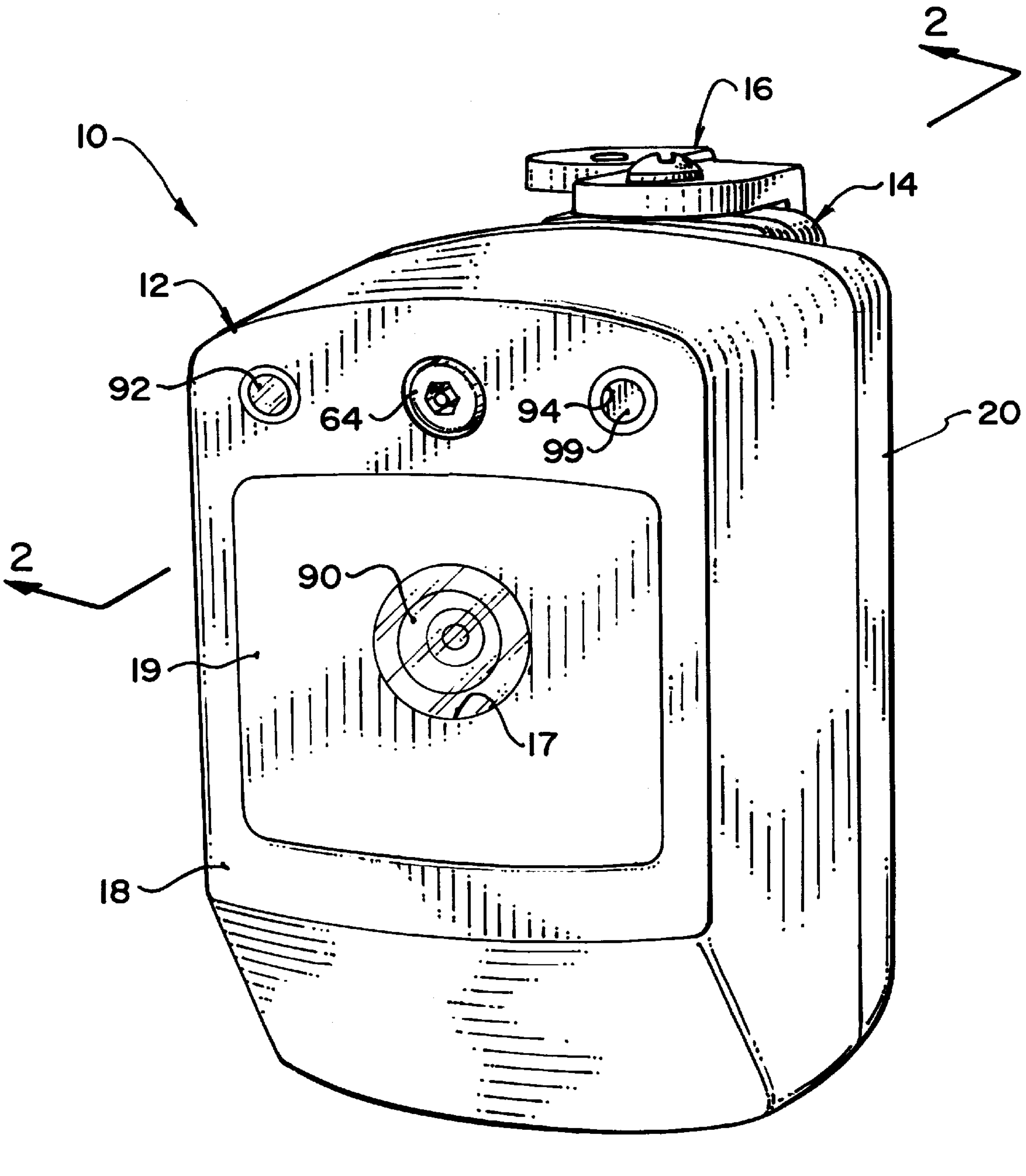
FIG. 1 is a perspective view of the camera housing of the invention.
Figures 2, 3, 3A:
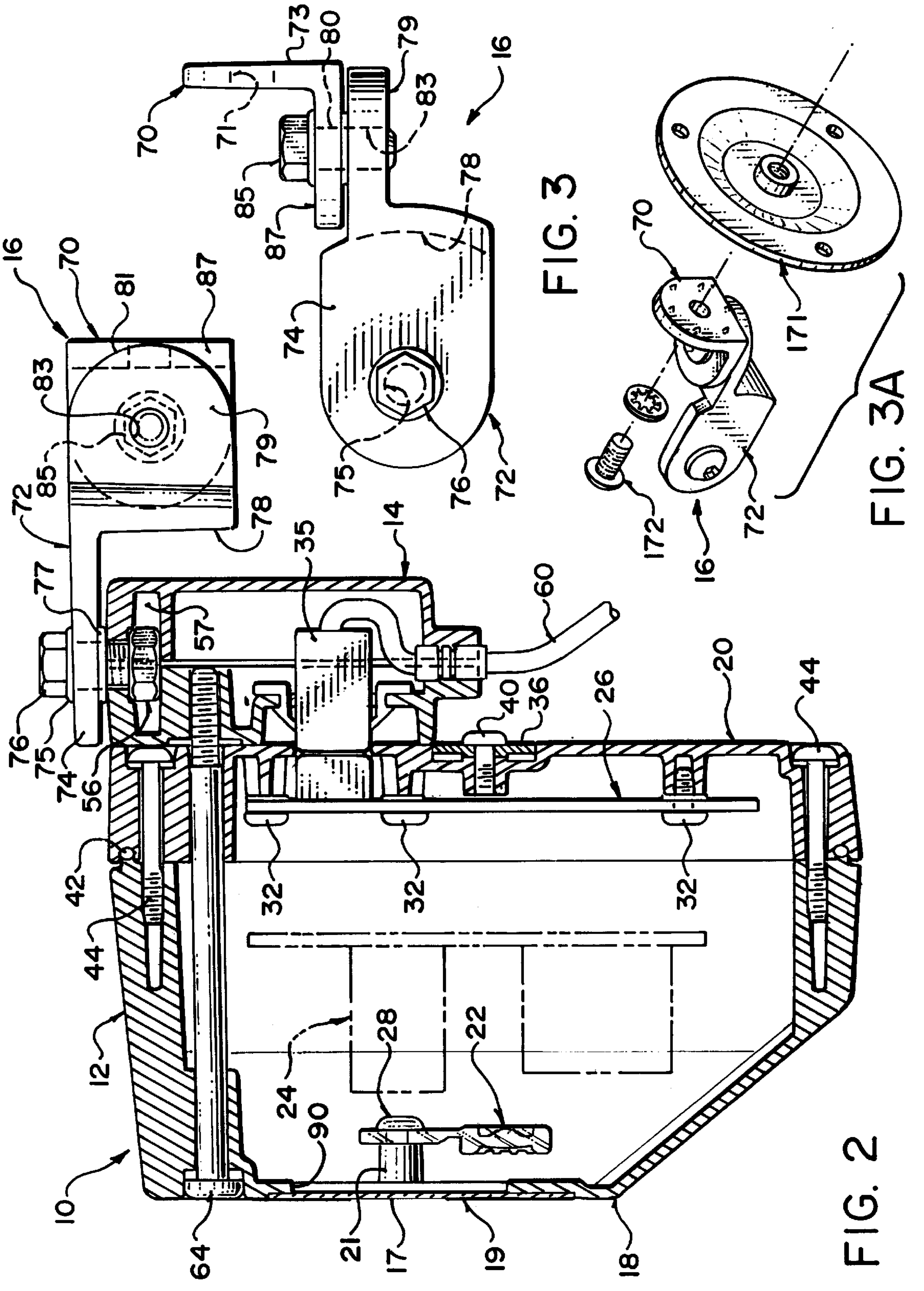
FIG. 2 is a cross-sectional view taken along lines 2—2 of FIG. 1, with the mounting bracket separated for clarity.
FIG. 3 is a top view of the mounting bracket shown in FIG. 2.
FIG. 3A is a perspective view of the mounting bracket shown in FIG. 2.
Figure 5:
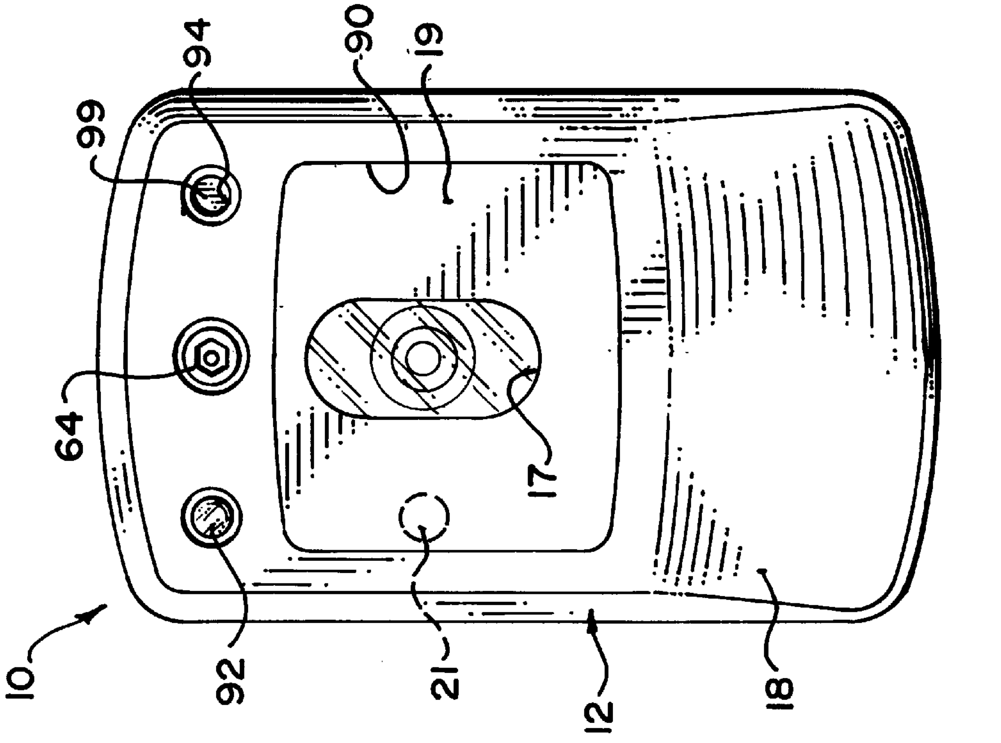
FIG. 5 is a front view of the camera housing.
Figure 7:
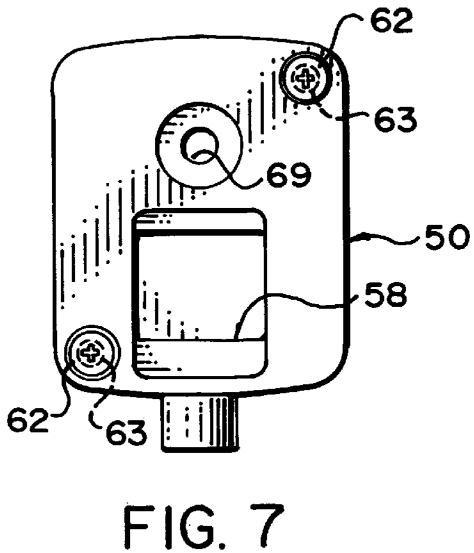
FIG. 7 is a front view of the mount box.

With reference to FIGS. 1 and 5, the front of housing 10 has a lens aperture 90 (shown as circular in FIG. 1 and as obround in FIGS. 2, 3, 4 and 5) covered with a transparent plastic portion 17 of cover plate 19, an indicator LED 92 which is illuminated, preferably intermittently, whether the unit is a live or dummy unit to indicate to the observer that the camera is active, and a microphone 99 within microphone aperture 94 for the live units. There are two types of dummy units, one type has a motherboard but no microphone or camera. The second type has an internal battery. A standard 'D' cell battery (not shown) is provided in the second type of dummy units to power the LED 92 and a flasher. The second type of dummy unit can be operated therefore without power from cable 60 and therefore without complete system wiring. So that the LED will not be illuminated in a dummy unit of the second type until it is installed, the battery circuit is only completed when the housing 10 is installed on mounting box 14. A jumper is provided within connector 35.

Figure 6:
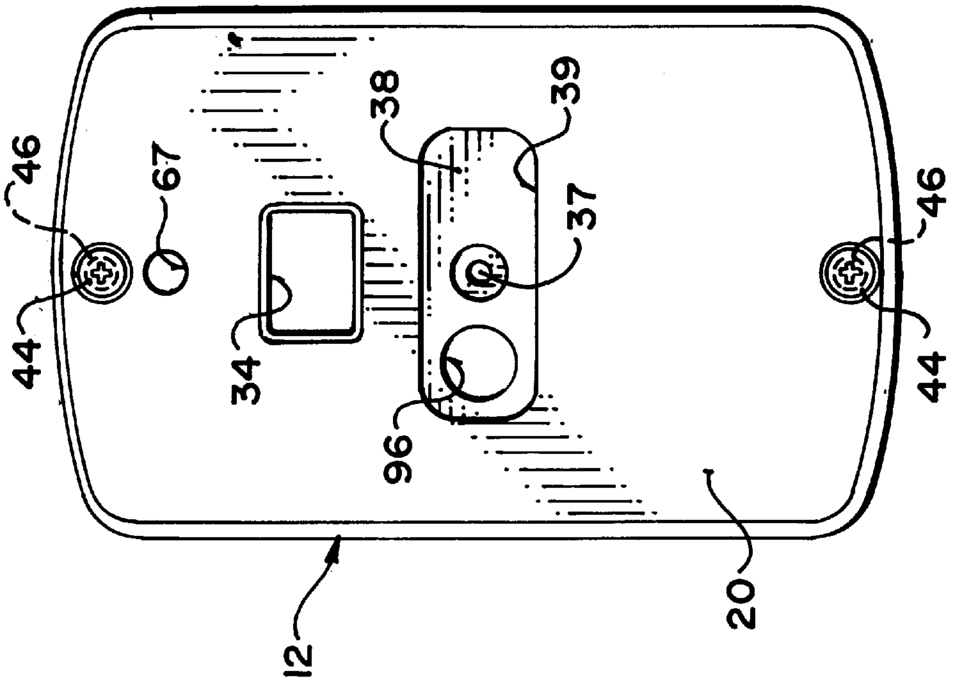
FIG. 6 is a rear view of the camera housing with the video socket cover plate removed.

FIG. 6 illustrates the back of the camera housing 10 with the video socket cover plate 36 removed, exposing the video socket 96. Video socket 96 is connected to the motherboard 26 to permit a 3-inch LCD monitor, or other video monitor, to be directly connected to the video output. This allows the installer to view the camera output from the monitor while the housing is being installed to facilitate the proper orientation of the camera housing.

Figure 9:
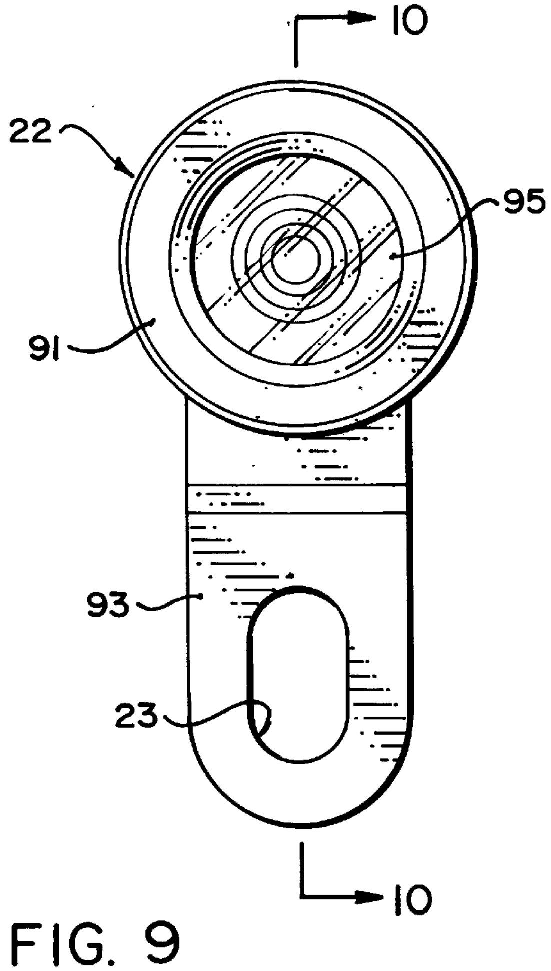
FIG. 9 is a front view of the dummy lens.
Figure 10:
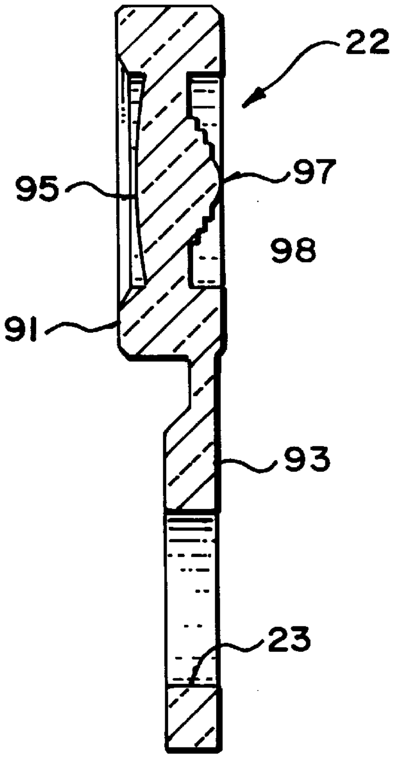
FIG. 10 is a cross-sectional view of the dummy lens taken along lines 10—10 of FIG. 9.

The structure of dummy lens 22 is shown in FIGS. 9 and 10. The dummy lens 22 is constructed of a clear acrylic and comprises a disc-like lens section 91 and an elongated support section 93 in which slot 23 is formed. The front face 95 of lens section 91 is radiused with an optical quality surface finish. The rear face 98 of lens section 91 is stepped to provide an impression of depth. The central radiused section 97 of face 98 also has an optical quality surface finish. A small blue circle may be stuck to central radiused section 97 to add to the impression of depth.

Figure 14:
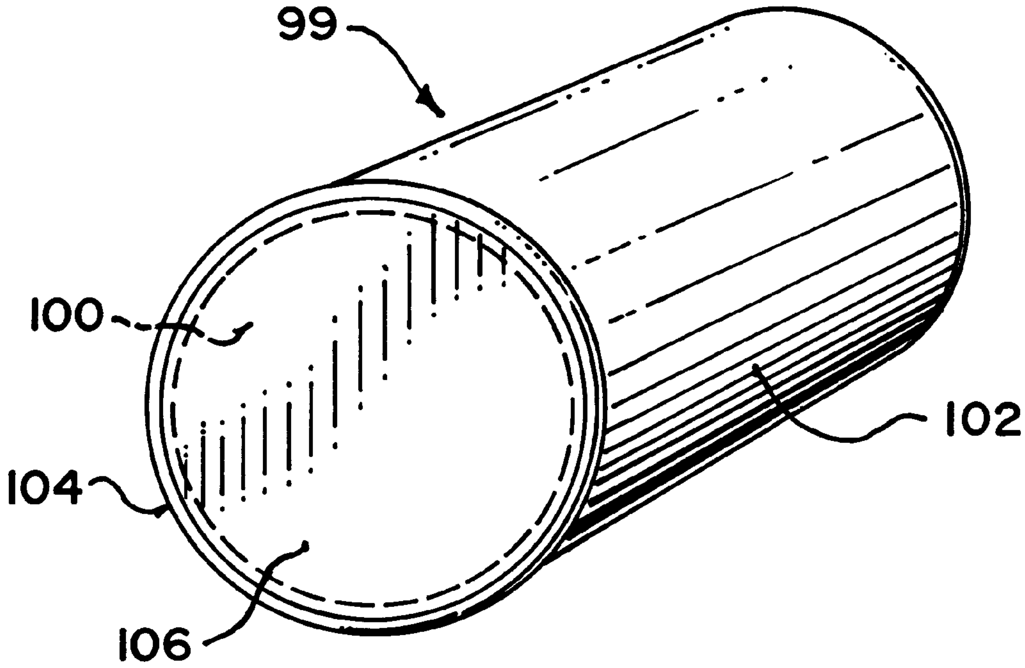
FIG. 14 is a perspective view of the microphone element of the invention.

The circuitry for the camera assembly board 24 is standard, preferably a CCD camera with 380 line resolution and low-light sensitivity with auto iris control for variable light conditions with compensation factoring. For the microphone 99, a microphone element is weatherproofed using a unique method. A microphone element is used which is essentially cylindrical with a sound sensitive surface 100 (FIG. 14) at one end of the cylinder 102. An "O"-ring 104 having an outside diameter approximately the same as the outside diameter of the microphone element is bonded to surface 100, using a cyanoacrylate adhesive at a minimum of three points on the "O"-ring. The microphone element 99 is then immersed, "O"-ring first, into a liquid plastic coating material, such as is sold under the trade-mark PLASTI DIP, ensuring that the surface normal of the microphone element sound sensitive surface is perpendicular to the surface of the PLASTI DIP. Once the microphone element is removed from the PLASTI DIP, a straight edge is drawn across the surface of the "O"-ring to remove any excess PLASTI DIP. Once the material has dried, there remains an impermeable membrane 106 much like a drum head above the sound sensitive surface. This membrane can also be made to surround the entire device, including electrical leads or components if so desired, by controlling the depth of immersion.

Figure 11:
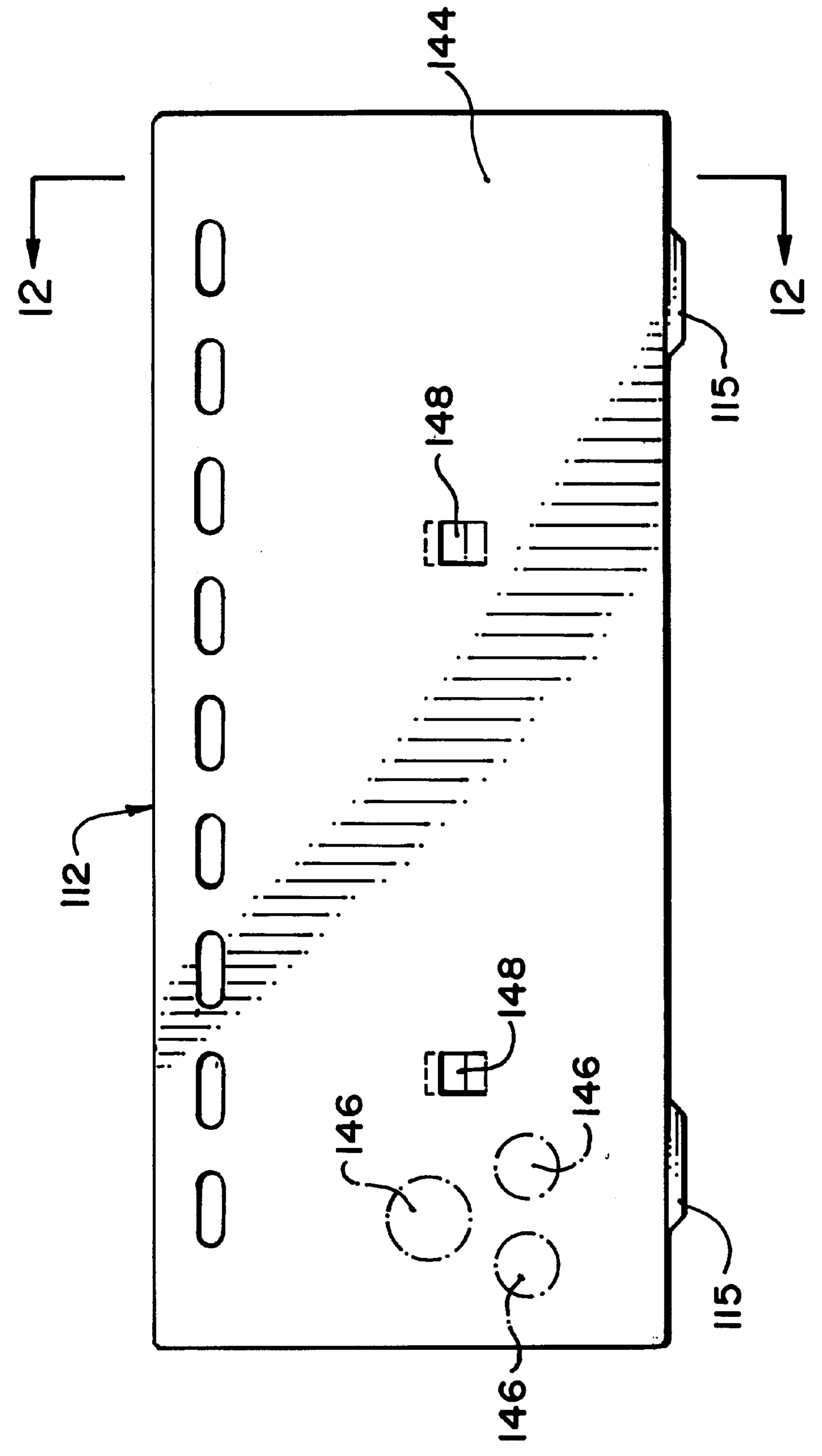
FIG. 11 is an end view of the VCR box assembly.
Figure 12:
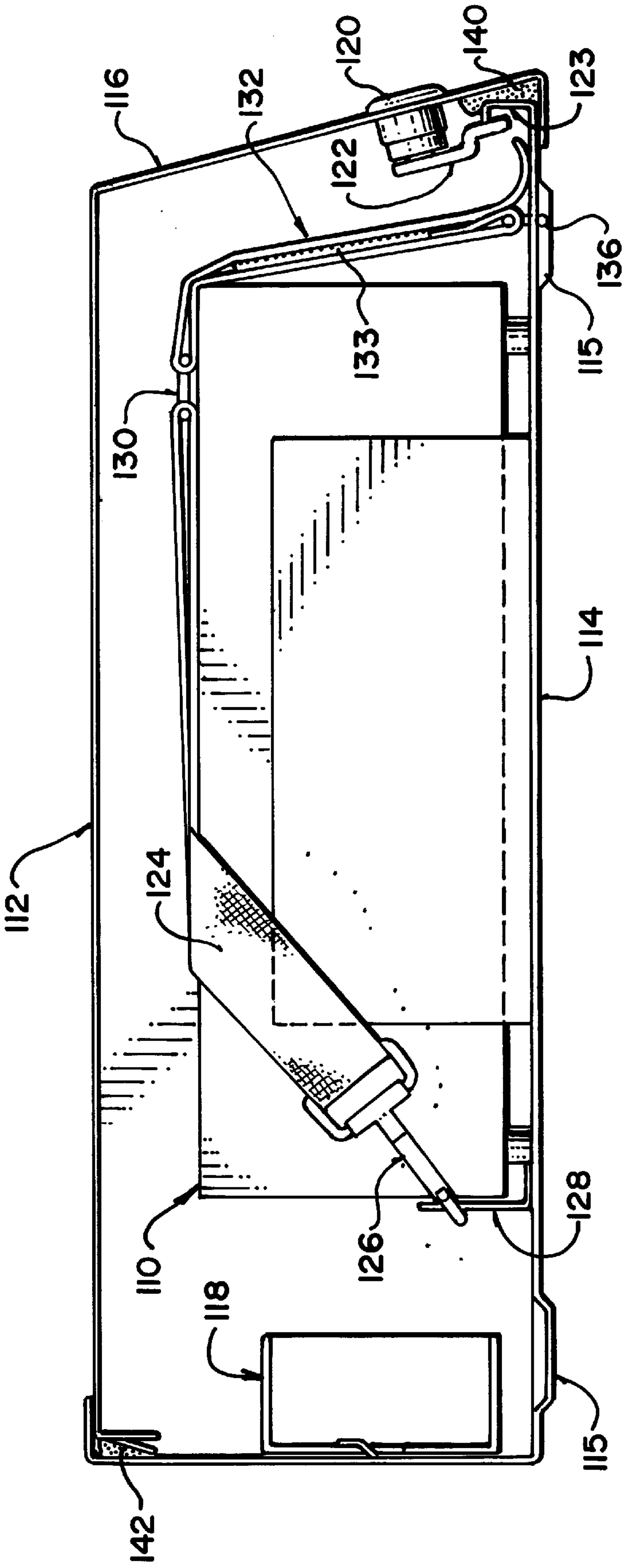
FIG. 12 a cross-sectional view of the VCR box assembly taken along lines 12—12 of FIG. 11.
Figure 13:
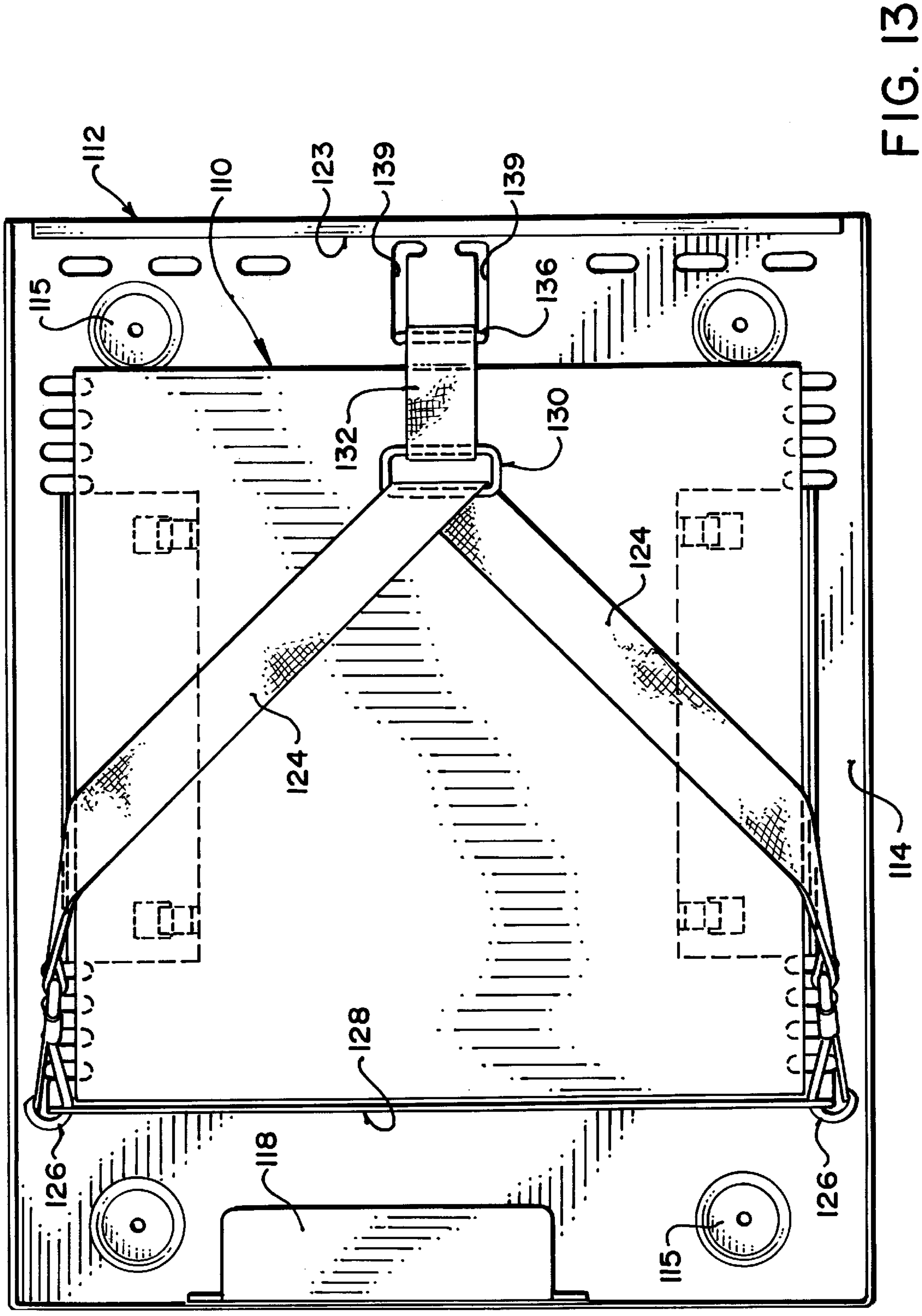
FIG. 13 is a top plan view of the VCR box assembly of FIG. 11 with the top panel removed.

FIGS. 11 through 13 illustrate the VCR 110 which records the signal from cable 60 and VCR box assembly 112 which stores it securely. VCR box 112 is constructed from a die-cast zinc and comprises a base 114 provided with feet 115 and a front and top panel 116 which slides out of the base 114 to expose the VCR 110 and switch box 118. A lock 120 locks the front panel in place with an arm 122 to a flange 123 fixed to base 114. A strap 124 of polyester webbing is secured by spring snaps 126 at either end to bar 128 attached to base 114 and runs over VCR 110, through loop 130. A strip of hook and loop fastener 133 on strap 132 is used to tighten loop 130 down to loop 136 which slides in grooves 139, thereby tightly securing VCR 110 in box 112. Foam pads are provided at 140 and foam tape at 142 to dampen vibration. End panel 144 shows the power and cable access 146 and mounting hooks 148 for the switch box.

In operation, the mounting bracket and mounting box will be installed in each school bus or other desired location in the proper orientation for camera operation. However only a limited number of camera housings 10 with actual camera assemblies 24 will be installed, the remaining housings 10 only containing dummy lenses 22. The mounting bracket 16 and mounting box 14, and cabling 60 to VCR box 112 are permanently installed. The dummy camera housings can be rapidly switched with the camera-equipped housings by simply removing bolt 64 and switching housings 10, without removing mounting bracket 16 or mounting box 14. The use of dummy lenses permits the use of a transparent cover lens rather than the half-silvered or tinted glass of the prior art, which reduced the brightness of the recorded image.

While the system has been described using a VCR, television monitors may be substituted for the VCR.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An audio/video surveillance recording system comprising:

i) a plurality of secure housings having a transparent lens aperture, at least one of said housings having a removable video camera adapted for producing a video signal mounted in the interior of said housing behind said lens aperture, and the remainder of said housings having a simulated lens in the interior of said housing behind said lens aperture, wherein each said housing is adapted to receive a removable video camera, and wherein said simulated lens is mounted for pivotal movement between a first position wherein said simulated lens is aligned in a position behind said lens aperture so as to be visible through said lens aperture from the exterior of said housing, and a second position wherein said simulated lens is not visible through said lens aperture from the exterior of said housing;

ii) a mounting assembly for adjustable securement to a surface and for removably receiving one of said secure housings; and iii) a video tape recorder and/or monitoring means connected to said one of said housings having a video camera for recording said video signal from said video camera;

and wherein each said mounting assembly comprises:

iv) a bracket member for securing to a surface;

v) a connector housing adapted for securing to said bracket member, and comprising cable means and connector means for connecting to a camera assembly within said secure housing;

and wherein each said secure housing comprises a front and a rear, adapted for securing said rear of said secure housing to said connector housing by means of a tamper-resistant fastener accessible from said front of said secure housing, and comprising a camera assembly for connecting to said connector means, wherein access to the interior of said secure housing is provided by at least one second fastener accessible only from said rear of said secure housing, access to said second fastener being available only when said secure housing is removed from said connector housing by unfastening said tamper-resistant fastener.

2. The audio/video surveillance recording system of claim 1 wherein a plurality of said secure housings each comprise illuminated indicator means on the exterior of said housings, and said remainder comprise housings which comprise battery means and conductive means for supplying electricity from said battery to said indicator means.

3. The audio/video surveillance recording system of claim 1 wherein said conductive means are arranged so an electricity-supplying circuit including said battery and said indicator means is formed when said housing is secured to said mounting assembly, and is broken when said housing is disconnected from said mounting assembly.

4. The audio/video surveillance recording system of claim 1 wherein said housing comprises in the interior thereof a post adjacent said lens aperture and said simulated lens is mounted for pivotal movement on one end of an elongated element, the other end of said elongated element being pivotally secured to said post.

5. The audio/video surveillance recording system of claim 4 wherein said simulated lens comprises a clear plastic disc having a smoothly finished forward surface and a stepped rear surface.

6. A secure housing and mounting assembly for a video monitoring camera for use in an audio/video surveillance recording system comprising a plurality of secure housings having a transparent lens aperture, at least one of said housings having a removable video camera adapted for producing a video signal mounted in the interior of said housing behind said lens aperture, and the remainder of said housings having a simulated lens in the interior of said housing behind said lens aperture, wherein each said housing is adapted to receive a removable video camera; and a video tape recorder and/or monitoring means connected to said one of said housings having a video camera for recording said video signal from said video camera;

said secure housing and mounting assembly comprising:

I) a bracket member for securing to a surface;

ii) a connector housing adapted for securing to said bracket member and comprising cable means and connector means for connecting to a camera assembly within a secure housing; and iii) said secure housing having a front and a rear, adapted for securing said rear of said secure housing to said connector housing by means of a tamper-resistant fastener accessible from said front of said secure housing, and comprising a camera assembly for connecting to said connector means, wherein access to the interior of said secure housing is provided by at least one second fastener assembly accessible only from said rear of said secure housing, access to said second fastener being available only when said secure housing is removed from said connector housing.

7. An audio/video surveillance recording system comprising:

i) a plurality of secure housings and mounting assemblies as claimed in claim 4 each having a transparent lens aperture, at least one of said secure housings and mounting assemblies having a video camera adapted for producing a video signal mounted in the interior of said secure housing behind said lens aperture, and the remainder of said secure housings and mounting assemblies having a simulated lens in the interior of said housing behind said lens aperture; and ii) a video tape recorder and/or monitoring means connected to said one of said secure housings and mounting assemblies having a video camera for recording and/or monitoring said video signal from said video camera.

8. The audio/video surveillance recording system of claim 7 wherein a plurality of said secure housings and mounting assemblies each comprise illuminated indicator means on the exterior of said secure housings, and said remainder comprise secure housings which comprise battery means and conductive means for supplying electricity from said battery to said indicator means.

9. The audio/video surveillance recording system of claim 8 wherein said conductive means are arranged so an electricity-supplying circuit including said battery and said indicator means is formed when said secure housing is secured to said connector housing, and is broken when said secure housing is disconnected from said connector housing.

* * * * *